(12) United States Patent
Schenk et al.

(10) Patent No.: US 10,921,572 B2
(45) Date of Patent: Feb. 16, 2021

(54) PHASE-CONTRAST MICROSCOPY METHOD, OPTICAL UNIT, AND PHASE-CONTRAST MICROSCOPE

(71) Applicant: FRAUNHOFER-GESELLSCHAFT ZUR FÖRDERUNG DER ANGEWANDTEN FORSCHUNG E. V., Munich (DE)

(72) Inventors: Friedrich Schenk, Aachen (DE); Benedict Diederich, Cologne (DE)

(73) Assignee: FRAUNHOFER-GESELLSCHAFT ZUR FÖRDERUNG DER ANGEWANDTEN FORSCHUNG E. V.

( * ) Notice: Subject to any disclaimer, the term of this patent is extended or adjusted under 35 U.S.C. 154(b) by 0 days.

(21) Appl. No.: 15/868,780

(22) Filed: Jan. 11, 2018

(65) Prior Publication Data
US 2018/0129030 A1     May 10, 2018

Related U.S. Application Data

(63) Continuation of application No. PCT/EP2016/066671, filed on Jul. 13, 2016.

(30) Foreign Application Priority Data

Jul. 14, 2015   (DE) ..................... 10 2015 111 426.7

(51) Int. Cl.
    *G02B 21/14*     (2006.01)
    *G02B 21/36*     (2006.01)

(52) U.S. Cl.
    CPC ........... *G02B 21/14* (2013.01); *G02B 21/361* (2013.01); *G02B 21/365* (2013.01)

(58) Field of Classification Search
    CPC ........ G02B 21/06; G02B 21/08; G02B 21/14; G02B 21/36; G02B 21/361; G02B 21/365;
(Continued)

(56) References Cited

U.S. PATENT DOCUMENTS

| 3,655,274 A | 4/1972 | Craig |
| 6,238,911 B1 | 5/2001 | Kasahara |

(Continued)

FOREIGN PATENT DOCUMENTS

| JP | 2010271537 | * 12/2010 |
| JP | 2016099592 | * 5/2016 |

(Continued)

OTHER PUBLICATIONS

ISA/EP, International Search Report and Written Opinion for PCT Patent Application No. PCT/EP2016/066671, dated Feb. 22, 2017.

*Primary Examiner* — Derek S. Chapel
*Assistant Examiner* — Adam W Booher
(74) *Attorney, Agent, or Firm* — Forrest Firm, P.C.

(57) ABSTRACT

A method for phase-contrast microscopy on a specimen, and the microscope and optical unit for carrying out the method, is provided. The specimen is arranged in a vessel having an object liquid, in which a component of an illumination beam, which serves as direct radiation and has not been diffracted by the sample, is applied to a phase-shifting element, is characterized in that the illumination beam is deflected before it enters the object liquid by way of an optical deflection element which is changeable in terms of position and/or shape so as to compensate for a change in the main radiation direction of the illumination beam that occurs due to optical refraction at the object liquid.

13 Claims, 2 Drawing Sheets

(58) Field of Classification Search
CPC .. G02B 26/004; G02B 26/08; G02B 26/0875; G02B 26/0883; G02B 26/0891; G02B 1/06; G02B 3/12; G02B 5/06; G02B 7/18; G02B 7/1805; G02B 7/181
See application file for complete search history.

(56) References Cited

U.S. PATENT DOCUMENTS

2012/0257040 A1   10/2012   Koebler et al.
2017/0322405 A1   11/2017   Matsubara
2018/0113294 A1*  4/2018   Shiraishi ................. G02B 7/28

FOREIGN PATENT DOCUMENTS

WO      2007038787 A1    4/2007
WO      2014031797 A1    2/2014
WO      2016084551 A1    6/2016

* cited by examiner

PHASE-CONTRAST MICROSCOPY METHOD, OPTICAL UNIT, AND PHASE-CONTRAST MICROSCOPE

CROSS-REFERENCE TO RELATED APPLICATIONS

This application is a national phase filing of PCT/EP16/66671 filed Jul. 13, 2016, which claims the benefit of priority to German application 10 2015 111 426.7 filed Jul. 14, 2015, the contents each of which are hereby incorporated by reference in their entirety.

TECHNICAL FIELD

The presently disclosed subject matter is directed towards a phase-contrast microscopy method, optic unit and phase-contrast microscope for countering the disadvantages due to a curvature of the object liquid surfaces at the specimen vessels.

BACKGROUND

Phase-contrast microscopy is primarily performed in transmitted light and is used for transparent objects, such as living cells. Without special measures to increase the contrast between direct radiation which has not been diffracted by a specimen and radiation which has been diffracted by the specimen, the visibility of the specimen is generally unsatisfactory. Staining to increase contrast has an undesired influence on the specimen, in particular in the case of living cells.

Using phase-contrast microscopy, a contrast can be produced without changing the specimen. It is known herefor to produce an illumination beam with a sufficient illumination aperture by way of a phase diaphragm which is arranged in the condenser and is typically annular. A component, which has not been diffracted by the specimen, of the illumination beam, which is the main maximum in the original propagation direction of the radiation and will be referred to as direct radiation below, is phase-shifted and attenuated using a phase-shifting element, comprising a phase-shifting retardation element and a gray filter, that is arranged in the image-side objective focal plane and is typically in the shape of a phase ring. The specimen radiation likewise undergoes phase shifting as it passes through the specimen. Due to interference of the direct radiation, which has been manipulated using the phase-shifting element, with the specimen radiation, the resulting phase shift between direct radiation and specimen radiation is converted into an amplitude change, as a result of which the desired contrast enhancement is achieved in the intermediate image of the specimen. What is important for phase-contrast is that the image of the opening of the phase diaphragm is completely covered by the phase-shifting element in the rear objective focal plane, in other words that no direct radiation travels past the phase-shifting element and disturbs the intermediate image.

If the specimen to be investigated is arranged in a liquid, referred to as object liquid below, in an open specimen vessel, an object liquid meniscus forms, which typically has a profile of the surface of the object liquid that deviates from a right angle with respect to the direction of gravity and thus the main radiation direction of the illumination beam, in particular at the periphery of the specimen vessel, and thus accordingly refracts the illumination beam. Said meniscus or periphery effect partially cancels out the phase-contrast effect and results in artefacts in the intermediate image. This is the case in particular in standardized cell culture vessels, aka microtiter plates, which consist of a multiplicity of isolated, typically round well-shaped specimen vessels, or wells, in which the cells to be investigated can be cultivated surrounded by a growth medium. The most typical formats of the microtiter plates have between 6 and 1536 individual wells over a base area of 128×85 mm. The result is a concavely curved object liquid meniscus within each well, whose disturbing influence increases with the decreasing diameter of the well. The stronger the meniscus is, i.e. in particular toward the periphery of the well, the greater is the component of direct radiation that is guided past the phase ring, with the result that the microscope increasingly operates in the bright field, as a result of which the contrast significantly drops during imaging of the cells. Since additionally an imaging camera chip is more strongly exposed, overexposure in the resulting microscopy image can occur.

Known are several approaches for addressing the mentioned problem in connection with the formation of the object liquid meniscus in microtiter plates. By way of example, EP 1 859 866 A1 discloses a microtiter plate having a hydrophobic material combination for the interior wall of the wells, which is intended to prevent the formation of a meniscus of the object liquid surface. The associated higher manufacturing costs for the microtiter plate are a disadvantage here.

It is known from US 2010/0197004 A1 or U.S. Pat. No. 6,074,614 A to provide the microtiter plate with a specifically shaped plate lid, which has transparent cylinders that project into the individual wells if the lid is in place and there have contact with the object liquid that includes the specimen. The lower side of said cylinders is planar, with the result that the object liquid surface is pushed flat and the meniscus is mechanically destroyed.

It is known from U.S. Pat. No. 6,238,911 B1 to cover the microtiter plate with a plate lid which has, above each well, a plastic lens which is inverse with respect to the object liquid lens. Optical correction is effected hereby. In addition to the particular manufacturing costs, it is disadvantageous that the compensation plastic lenses of the plate lid are matched to a specific surface curvature of the object liquid in the wells. If the type of object liquid changes, the optical correction may no longer work because different object liquids have different hydrostatic interactions with the internal wall of the wells, with the result that different surface curvatures form.

A phase-contrast microscopy method and a phase-contrast microscope of the type mentioned in the introduction are known from US 2012/0257040 A1. This document proposes to use, rather than a typical ring diaphragm, an adjustable unit that can be used to change the cross-section of the illumination beam. To this end, a liquid crystal display (LCD) is used, which acts as a phase diaphragm having an opening whose shape can be changed. A Bertrand lens, which can be connected in via a semi-transmissive mirror, can be used to check whether the direct radiation is completely incident on the phase ring. If necessary, the shape of the phase diaphragm which is realized with the LCD is changed so as to achieve best possible coverage of the direct radiation with the phase ring. However, the flexible deformation of the diaphragm by way of the LCD alone would not be able to compensate for the negative effects of the meniscus effect. This is because the LCD can effect only adaptations of the phase diaphragm shape within the plane perpendicular to the illumination direction, which, as a single measure, results only in a slight correction of the distortions of the direct radiation. In addition, this works to a satisfactory degree only for as long as the meniscus curvature does not exceed a specific degree. The object liquid meniscus within the well of a microtiter plate not only displaces the image of the diaphragm opening within the rear objective focal plane, but also deteriorates the imaging relationship between the diaphragm opening and the phase ring in the axial direction by a spatially varying imaging scale. The result is a type of image field curvature and a distortion of the image of the diaphragm opening. As a result, the diaphragm opening cannot be imaged sharply in the rear objective focal plane.

An optical unit, comprising an optical deflection element having an entry surface and an exit surface and means for controllably changing the angle between entry surface and exit surface, wherein a viscous mass is arranged between entry surface and exit surface, is known from U.S. Pat. No. 3,514,192 A. The liquid-filled prism is provided with transparent delimitation walls, whose angles with respect to one another can be changed, with the result that the refraction produced using the prism is controllable. It is known to use the liquid-filled adaptive prism to compensate for image movements or to minimize chromatic dispersion.

It is therefore an object of the present invention to make available a phase-contrast microscopy method, an optical unit, and a phase-contrast microscope of the type mentioned in the introduction, which counter in alternative manners the disadvantages due to a curvature of the object liquid surfaces at the specimen vessels.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Further, the claimed subject matter is not limited to implementations that solve any or all disadvantages noted in any part of this disclosure.

According to at least one embodiment of the disclosed subject matter, a method for phase-contrast microscopy on a specimen is provided. The specimen is arranged in a specimen vessel having an object liquid, in which a component of an illumination beam, which serves as direct radiation and has not been diffracted by the sample, is applied to a phase-shifting element, characterized in that the illumination beam is deflected before it enters the object liquid by way of an optical deflection element which is changeable in terms of position and/or shape so as to compensate for a change in the main radiation direction of the illumination beam that occurs due to optical refraction at the object liquid.

According to at least one embodiment of the method, the method is characterized in that an overlap of direct radiation and phase-shifting element, occurring at the location of the phase-shifting element, is checked and, to optimize the overlap, the cross-section geometry of the illumination beam and/or the position, as it is in a plane perpendicular to the main radiation direction of the illumination beam, is changed, before it is incident on the deflection element, using at least one changeable optical adaptation element.

According to at least one embodiment of the method, the method is characterized in that an optical pattern is produced in the beam path in front of the specimen vessel, an optical distortion of the pattern that is produced in the region of the specimen vessel is captured, and the extent of the pattern distortion is used to automatically control the position and/or shape of the optical deflection element.

According to at least one embodiment of the method, the method is characterized in that an optical pattern is produced in the beam path in front of the specimen vessel, an optical distortion of the pattern that is produced in the region of the specimen vessel is captured, and the extent of the pattern distortion is used to automatically control the position and/or shape of the optical deflection element and/or to control the optical adaptation element.

According to at least one embodiment of the disclosed subject matter, a phase-contrast microscope is provided. The microscope is suitable for observing a specimen under the microscope, which specimen is arranged in a specimen vessel that includes an object liquid, comprising means for producing an illumination beam, and an object holder for holding the specimen vessel, characterized by at least one optical deflection element, which is arranged in the beam path of the illumination beam in front of the object holder for changing the direction of the main radiation direction of the illumination beam, and means for changing the position and/or shape of the optical deflection element.

According to at least one embodiment of the microscope, the microscope is characterized in that the deflection element is swivable about at least one axis perpendicular to the beam direction of the incident illumination beam.

According to at least one embodiment of the microscope, the microscope comprises an optical unit, the optical unit comprising the optical deflection element, wherein the deflection element has an entry surface and an exit surface and means for controllably changing the angle between entry surface and exit surface, wherein a viscous mass is arranged between entry surface and exit surface, and wherein the entry surface is determined by a surface of the viscous mass that is formed in a gravity field.

According to at least one embodiment of the microscope, the microscope is characterized in that the entry surface is formed by a rigid and transparent cover element which floats or lies indirectly or directly on the surface of the viscous mass.

According to at least one embodiment of the microscope, the microscope comprises an optical unit, the optical unit comprising the optical deflection element, wherein the deflection element has an entry surface and an exit surface and means for controllably changing the angle between entry surface and exit surface, wherein a viscous mass is arranged between entry surface and exit surface, and wherein the entry surface is determined by a surface of the viscous mass that is formed in a gravity field.

According to at least one embodiment of the microscope, the microscope is characterized in that the deflection element is displaceable in at least one direction that is perpendicular to the beam direction of the illumination beam and has a curved exit surface provided for the exit of the illumination beam.

According to at least one embodiment of the microscope, the microscope is characterized in that the deflection element is like a prism, and has an entry surface that is formed by a first delimitation wall and an exit surface that is formed by a second delimitation wall and means for the controllable change of the angle between entry surface and exit surface, wherein a viscous mass is arranged between the entry surface and exit surface.

According to at least one embodiment of the microscope, the microscope comprises means for observing the overlap of a component of the illumination beam that has not been diffracted by the specimen and serves as direct radiation with a phase-shifting element and by way of at least one changeable optical adaptation element for changing the cross-section geometry of the illumination beam and/or its position determined in a plane perpendicular to the main radiation direction of the illumination beam.

According to at least one embodiment of the microscope, the microscope is characterized in that the means for observing the overlap comprise a Bertrand lens unit having at least one lens, which is variably shapeable in terms of its focal position, and means for controlling the at least one shapeable lens.

According to at least one embodiment of the microscope, the microscope comprises means for producing an optical pattern said means being arranged in the beam path in front of the specimen vessel, means for determining the optical distortion of the pattern caused in the region of the specimen vessel, and means for controlling the position and/or shape of the optical deflection element.

According to at least one embodiment of the microscope, the microscope comprises means for producing an optical pattern said means being arranged in the beam path in front of the specimen vessel, means for determining the optical distortion of the pattern caused in the region of the specimen vessel, and means for controlling the position and/or shape of the optical deflection element and/or for controlling the optical adaptation element.

BRIEF DESCRIPTION OF THE DRAWINGS

The foregoing, as well as the following Detailed Description of preferred embodiments, is better understood when read in conjunction with the appended drawings. For the purposes of illustration, there is shown in the drawings exemplary embodiments; however, the presently disclosed subject matter is not limited to the specific methods and instrumentalities disclosed.

DETAILED DESCRIPTION

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

In a method for phase-contrast microscopy of the type mentioned in the introduction, the object is achieved by way of the characterizing features of the illumination beam being deflected before it enters the object liquid by way of an optical deflection element which is changeable in terms of position and/or shape so as to compensate for a change in the main radiation direction of the illumination beam that occurs due to optical refraction at the object liquid. According to these embodiments, the illumination beam is deflected before it enters the object liquid by way of an optical deflection element which is changeable in terms of position and/or shape so as to compensate for a change in the main radiation direction of the illumination beam that occurs due to optical refraction at the object liquid.

The compensation can advantageously be such that the main radiation direction of the illumination beam, after it leaves the specimen vessel, is parallel with respect to its original main radiation direction as it was before the deflection by the deflection element. Merely a lateral offset in the main radiation direction occurs, which can be corrected, however, by way of a corresponding opposite lateral displacement of the illumination beam before it enters the deflection element. The latter is done e.g. by a corresponding displacement of the source of the illumination beam, e.g. a phase diaphragm.

In this way, the effect of the object liquid surface on the illumination beam can be at least partially compensated for, and covering of the direct radiation with the phase-shifting element can be achieved. The changeability of the adaptation element in terms of shape and/or position permits the selection of the deflection of the illumination beam in dependence on the angle of the object liquid with respect to the optical axis of the microscope.

The main radiation direction of the illumination beam within the meaning of this invention is its central axis which extends in the beam direction, in the case of a symmetric illumination beam its axis of symmetry, as can be the case in particular in an annular phase diaphragm.

The method according to the invention can also be performed such that overlap of direct radiation and phase-shifting element is monitored e.g. using a Bertrand lens unit and, for optimizing overlap, the cross-section geometry of the illumination beam and/or the position as it is in a plane perpendicular to the optical axis of the illumination beam is changed using at least one changeable optical adaptation element before it is incident on the deflection element.

Compensating for the influence of the meniscus of the object liquid can be supported by the effect of the changeable optical adaptation element, which is preferably arranged in the radiation direction in front of the deflection element. If the illumination beam is shaped using a phase diaphragm, the change in position of the illumination beam and/or its cross-section geometry can be effected by changing the shape of the opening of the phase diaphragm, which then simultaneously represents the optical adaptation element. The phase diaphragm, which is changeable in terms of its shape, can be realized for example—as is known from the previously mentioned prior art in accordance with US 2012/0257040 A1—by way of an LCD. If it is finally ensured that the image of the phase diaphragm opening strikes the phase-shifting element completely, then the contrast of the image of the specimen to be observed under the microscope is maximal. Also conceivable is the production of the illumination beam without a phase diaphragm, but using a suitable radiation source, e.g. an LED array. The adaptation element in this case can be the LED array, wherein the LEDs are differently switched for different shapes of the illumination beam.

The method according to the invention can also be performed such that an optical pattern is produced in the beam path in front of the specimen vessel, an optical distortion of the pattern that is produced in the region of the specimen vessel is captured, and the extent of the pattern distortion is used to automatically control the position and/or shape of the optical deflection element and/or to control the optical adaptation element. Producing the optical pattern, e.g. with a regular grating structure, can be done with a separate unit or likewise by way of the LCD. In this way, fully automated optimization of the contrast of the microscope image can be established by regulating in particular the parameters for the deflection element and/or the adaptation element.

According to some embodiments of the invention, an optical unit comprising an optical deflection element 8 having an entry surface 25, 29 and an exit surface 23, 26 and means for controllably changing the angle between entry surface 25, 29 and exit surface 23, 26, wherein a viscous mass 9 is arranged between entry surface 25, 29 and exit surface 23, 26 is provided. The object according to the invention is achieved by the optical unit in that the entry surface is determined by a surface of the viscous mass that is formed in a gravity field. As a result, a highly effective and simple, yet effective variant of an adaptive deflection element is provided.

If the deflection element is used in a phase-contrast microscope, it serves to deflect the main radiation direction of the illumination beam, as required. However, the optical unit is usable also outside a phase-contrast microscope so as to be able to use the variability of the adaptive deflection element for the controlled manipulation of radiation that travels through the deflection element.

The viscous mass has a higher optical density than the atmosphere surrounding the deflection element, in particular air, and can consist e.g. of a liquid, such as water, or a gel. The viscous mass can also correspond, in terms of material and/or optical property, to the optical density of the object liquid in the specimen vessel.

The deflection element can comprise an open vessel having the viscous mass such that the entry surface is formed directly by the surface of the viscous masses.

In order to reduce or entirely exclude undesired effects of a movement of the surface of the viscous mass, e.g. due to vibration, the optical unit can also be configured such that the entry surface is formed by way of a rigid and transparent cover element which floats or lies indirectly or directly on the surface of the viscous mass. The cover element preferably has an elevated periphery so as to prevent the viscous mass from spilling onto the upper surface of the cover element. The location of the cover element in space and thus also the location of the entry surface are determined by the surface of the viscous mass.

According to the invention, the optical unit can be provided with means for swiveling the deflection element around at least one swivel axis. The upper surface of the viscous mass, preferably a liquid, that defines the entry surface remains horizontal in the gravity field even during a swivel movement about a swivel axis that is perpendicular with respect to the direction of gravity, while the exit surface that is provided in a by a transparent bottom wall of a carrier for the viscous mass changes its angle with respect to the direction of gravity in the case of the swivel movement. As a result, the angle between the exit surface and the entry surface also changes, as a result of which an adaptive deflection element is realized. Preferably, two linear swivel axes which are independent of one another are provided.

In a phase-contrast microscope of the type mentioned in the Summary, the object is achieved by way of the characterizing features of at least one optical deflection element 8, 24, which is arranged in the beam path of the illumination beam 3, 27 in front of the object holder 7 for changing the direction of the main radiation direction 28 of the illumination beam 3, 27, and means for changing the position and/or shape of the optical deflection element 8, 24.

As an alternative to the optical unit having an adaptive deflection element, it is also possible to use a deflection element which has a constant shape and whose surfaces have, on an entry side for the illumination beam and on an exit side for the illumination beam, spatially different angles with respect to one another. For example, the entry side could have a planar shape and the exit surface could have a profile having one or more curvatures. Such a deflection element could be placed such that the illumination beam enters the entry side perpendicularly and exits the exit side at a location where the exit surface is not parallel to the entry surface, with the result that the illumination beam is correspondingly refracted. If such an optical element is then laterally displaced, the angular relationship between the entry surface and the exit surface changes for the illumination beam, with the result that the deflection of the illumination beam is also correspondingly changed.

It is also conceivable for the shape-constant deflection element to provide means for performing swivel movements about at least one swivel axis that is parallel with respect to the entry surface or pivot movements, e.g. about an axis of rotation that is parallel with respect to the direction of the entering illumination, to increase the possibilities for deflection of the illumination beam.

The phase-contrast microscope according to the invention can advantageously also be configured such that the deflection element is preferably like a prism, and has an entry surface that is formed by a first delimitation wall and an exit surface that is formed by a second delimitation wall and also means for the controllable change of the angle between entry surface and exit surface, wherein a viscous mass is arranged between the entry surface and exit surface.

Here, the deflection element can be set such that any desired irradiation directions can be provided, in particular also in the horizontal direction, with the result that no dependence on the direction of the field of gravity exists anymore. A vessel forming the deflection element can also be open on top or be covered by a flexible skin, e.g. a membrane, with the result that the viscous mass can follow the movement of the delimitation wall or walls. To prevent the viscous mass from exiting, seals or flexible, e.g. film-type, wall elements, e.g. made of a rubber, that connect the delimitation walls to one another can be provided, which permit the movement of neighboring delimitation walls with respect to one another.

The means for the controlled movement of the at least one delimitation wall can be actuators which have been equipped with motors or are driven hydraulically or pneumatically.

The optical unit according to the invention can be equipped with means for the translational and/or rotational movement of the deflection element. These measures further increase the possibilities of manipulation of the radiation using the adaptive deflection element.

As has already been stated further above, the overlap of direct radiation and phase-shifting element is optically checked, to which end a Bertrand lens unit having at least one shapeable lens that is variable in terms of its focal position is preferably used. The focal position can be set by way of means for controlling the at least one shapeable lens. It is possible in this way to leave the Bertrand lens unit permanently in the microscope and to switch between an operating state for observing by way of microscope, i.e. to observe the specimen, and an operating state for checking the overlap of the direct radiation with the phase-shifting element, i.e. for checking the correct imaging of the phase diaphragm opening onto the phase-shifting element. It is thus no longer necessary to pan in a Bertrand lens or to use a semi-transmissive mirror.

A preferred embodiment of the phase-contrast microscopy method according to the invention and preferred embodiments of an optical unit and of the phase-contrast microscope according to the invention will be explained below with reference to figures.

Figure 1:
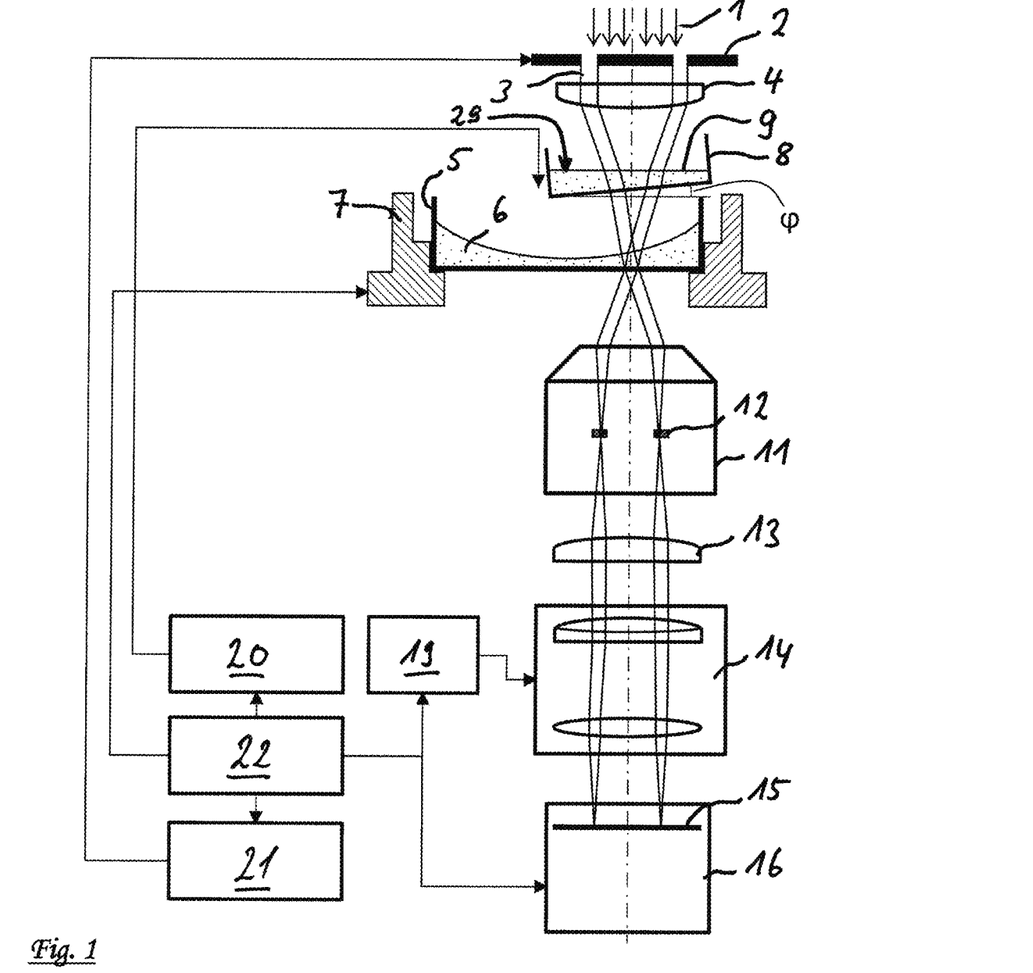
FIG. 1 is a schematic view of a phase-contrast microscope according to one or more embodiments of the presently disclosed subject matter.
Figure 2A:
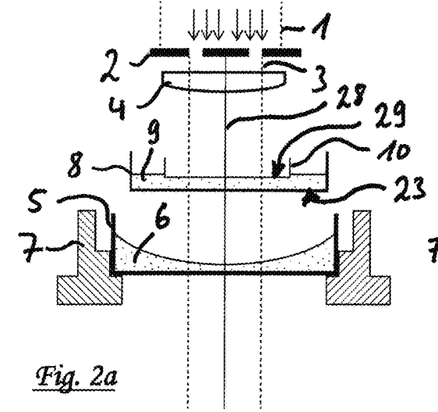
FIG. 2a is a schematic view of a section of the phase-contrast microscope without deflection of the illumination beam by a deflection element according to one or more embodiments of the presently disclosed subject matter.
Figure 2B:
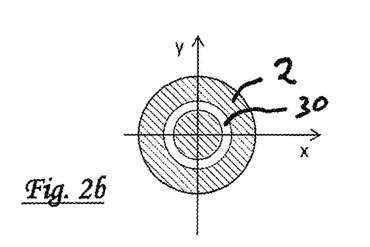
FIG. 2b is a schematic view of the position of the phase ring in the situation illustrated in FIG. 2a according to one or more embodiments of the presently disclosed subject matter.
Figure 3A:
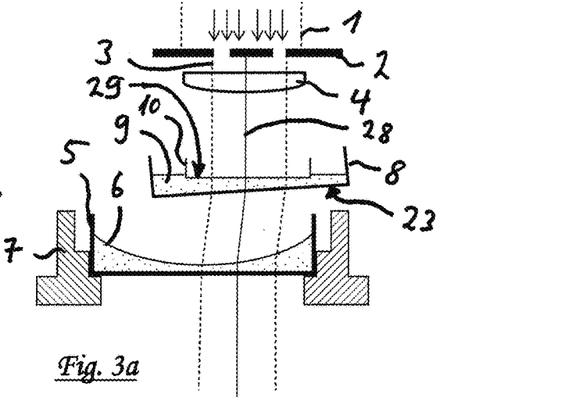
FIG. 3a is a schematic view of the section in accordance with FIG. 2a with deflection of the illumination beam according to one or more embodiments of the presently disclosed subject matter.
Figure 3B:
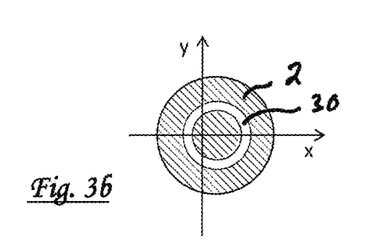
FIG. 3b is schematic view of the position of the phase ring in the situation illustrated in FIG. 3a according to one or more embodiments of the presently disclosed subject matter.

FIG. 1 schematically shows a phase-contrast microscope, wherein the individual constituent components deviate from the actual size ratios to simplify illustration. A source radiation beam 1 produced by a light source (not illustrated) is incident on a phase diaphragm 2, through which an illumination beam 3 passes. FIGS. 2 and 3 do not show the cross-sectional form of the illumination beam 3, but merely schematically indicate a region within which the illumination beam 3 having a main radiation direction 28 (illustrated here by a solid line) travels.

After the illumination beam 3 exits the phase diaphragm 2, it strikes a condenser 4, which focuses the illumination beam 3 onto a specimen (not separately illustrated here) located within a specimen vessel 5, which includes an object liquid 6. The specimen vessel 5 can be, for example, the well of a microtiter plate. However, the specimen vessel 5 can also be a single vessel or any other vessel combination. In FIGS. 1, 2a and 3a, the specimen vessel 5 is carried by an object holder 7, the position of which can preferably be changed using a controller 22. A microtiter plate or any other object with at least one specimen vessel 5 would correspondingly also be carried by the object holder 7.

Located between the condenser 4 and the specimen vessel 5 is an adaptive deflection element 8, in which a deflection element liquid 9 is located. The deflection element liquid 9 is transparent for the radiation of the illumination beam 3, and in the case of FIG. 1 forms an entry surface 29 for the illumination beam 3 and can be, for example, water. Preferably, although not necessarily, liquids that correspond to the object liquid 6 in terms of optical behavior, e.g. a growing medium, are used for the deflection element 8. Here, liquids having a viscosity which is higher than that of water should be considered advantageous.

As shown in FIGS. 2a and 3a, the deflection element liquid 9 can be partly provided with a cover 10, which is likewise transparent for the used radiation of the illumination beam 3 and thus forms the entry surface 29 thereof to the deflection element 8. The cover 10, which can be formed for example by a petri dish, prevents waves or other unevennesses on the surface of the deflection element liquid 9 that are produced for example by vibrations from having an undesired influence. The manner in which the deflection element 8 works will be illustrated in more detail below.

Subsequently, the illumination beam 3 passes through an objective 11, which has a phase ring 12. The phase ring 12 comprises a phase-shifting retardation element and a gray filter (neither is illustrated here in detail), as a result of which the incident component of the illumination beam 3 is attenuated and phase-shifted. After the objective 11, the radiation passes, depending on the type of phase-contrast microscope, through an optional tube lens 13 and a Bertrand lens unit 14 before it is incident on the image sensor 15 of a camera 16.

In order to obtain an image of the transilluminated specimen with the highest possible contrast, the annular opening of the phase diaphragm 2 should be imaged completely onto the phase ring 12 using a component of the illumination beam 3 that has not been diffracted by the specimen. This component of the illumination beam 3, which has not been diffracted by the specimen and is referred to below as direct radiation, is—as already mentioned—attenuated and phase-shifted in the phase ring 12. A component of the illumination beam 3 which has been diffracted by the specimen, on the other hand, travels past the phase ring 12 and interferes with the direct radiation to give the high-contrast microscope image of the specimen. The image is observed using an eyepiece or—as is illustrated here in an advantageous variant—with an image sensor 15 of a camera 16.

FIG. 2a shows a situation in which the illumination beam 3 is incident on the center of the specimen vessel 5. Here, a meniscus of the surface of the object liquid 6 is not formed or only weakly formed. The illumination beam 3 is consequently incident on the objective 11 and the phase ring 12 without being subjected to any significant refraction due to the specimen vessel 6 and its object liquid 6 (see FIG. 1). The phase ring 12 and the phase diaphragm 2 are aligned with one another for this progression of radiation which is undisturbed by the specimen vessel 5, with the result that the direct radiation is incident completely on the phase ring 12.

By contrast, FIG. 3a shows the situation in which a specimen region is to be investigated which is positioned closer to the periphery of the specimen vessel 5, where, due to the formation of a meniscus, the level of the object liquid 6 already has formed a noticeable inclination with respect to the horizontal. Without special measures, the illumination beam 3 would be refracted upon entry in the object liquid 6, as a result of which the direct radiation would at least partially miss the phase ring 12. To counter this effect, the deflection element 8 is inclined such that a lower boundary surface of the deflection element 8, which serves as an exit surface 23 for the radiation, is no longer perpendicular with respect to the main radiation direction 28 and refraction of the illumination beam 3 takes place at the exit surface 23 with a change in the main radiation direction 28. The degree of the inclination of the deflection element 8 and thus the deflection of the main beam direction should be selected such that the main radiation direction 28, after exit of the illumination beam 3 from the specimen vessel 5, is parallel with respect to the optical axis of the part of the microscope that follows the specimen vessel 5 in the beam direction. If the optical density of the deflection element 8 is identical to the optical density of the object liquid 6, the inclination is preferably chosen such that the exit surface 23 is aligned parallel with respect to the tangent to the surface curvature of the object liquid 6. If the optical densities of deflection element 8 and object liquid 6 differ, corresponding angles between the tangent to the surface curvature and the exit surface 23 are expedient. Of significance for the tangent is the location of the intersection of the main radiation direction 28 or optical axis of the illumination beam 3 and the surface of the object liquid 6. In order to permit a corresponding pivoting or swivel movement, the deflection element 8 is mounted on a holder (not illustrated here) which is swiveling about two swivel axes. The two swivel axes are perpendicular with respect to the main radiation direction 28 of the illumination beam 3.

Due to the swiveling, the deflection element 8 changes its shape, because the surface of the deflection element liquid 9 continues to be aligned perpendicular with respect to the direction of gravity. The deflection element 8 therefore forms an adaptive prism using the swivel means (not illustrated in FIGS. 2a and 3a).

The illumination beam 3 undergoes refraction in a deflection element 8, which is swiveled by an angle $\varphi$, owing to the exit surface 23, i.e. a deflection of the main radiation direction 28, and is refracted at the surface of the object liquid 6. Upon exit from the specimen vessel 6, the illumination beam 3 undergoes another refraction, with the result that the main radiation direction 28 once again runs parallel to the original main radiation direction 28 as it was before striking the deflection element 8. Merely a lateral displacement has taken place.

The parallel displacement of the illumination beam 3 which has taken place due to the refractions at the deflection element 8 and object liquid 6 is compensated by corresponding displacement of the phase diaphragm 2 and the opening 30 thereof. The displacement of the phase diaphragm is illustrated in symbolized fashion in FIG. 3b Such a displacement is not necessary in the situation shown in FIG. 2a, as is symbolically illustrated in FIG. 2b. A distortion of the image due to the liquid meniscus of the object liquid 6 is in this way largely, or ideally completely, avoided.

The phase diaphragm 2, which is illustrated merely schematically in FIGS. 1, 2a and 3a, can thus be realized by way of a typical rigid phase diaphragm body, which is displaceable merely within a plane that is parallel with respect to its central plane.

It is alternatively also possible for the phase diaphragm 2 to be realized by way of a liquid crystal display (LCD), as is known from US 2012/0257040 A1, as illustrated in the introduction. In this way, mechanical displacement within the plane can be avoided. The LCD could act as an electronically variable phase diaphragm 2, wherein advantageously it is not only possible to displace the phase diaphragm opening 30 as a whole, but also to effect a change in the shape of the phase diaphragm opening 30. The latter can become necessary if—for example owing to the specific extent of the curvature of the meniscus of the object liquid 6—a distorted image of the phase diaphragm opening 30 occurs after all.

The Bertrand lens unit 14 illustrated in FIG. 1 will be explained in more detail below with reference to FIGS. 4 and 5. The variant of the Bertrand lens unit 14 illustrated here is not mandatory. It is alternatively possible to insert a Bertrand lens, which is known per se, by way of swiveling it into the beam path of the phase-contrast microscope in the phase-contrast microscope according to the invention or to arrange the inclusion of an external Bertrand lens by way of a semi-transmissive mirror. It is known from the prior art that a Bertrand lens is used to check the imaging of the opening of the phase diaphragm 2 onto the phase ring 12.

Figure 4:
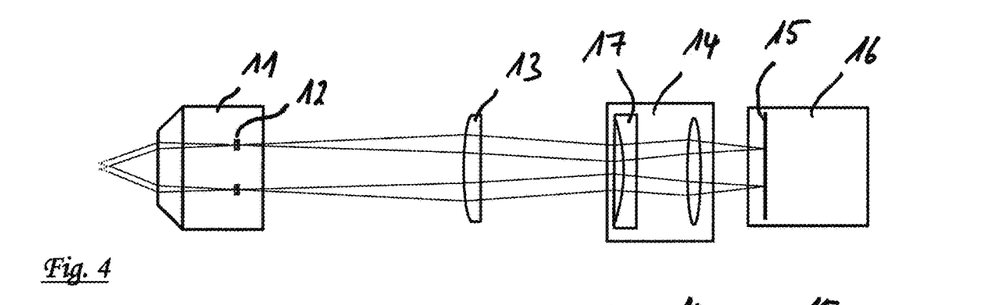
FIG. 4 is a schematic view of a further section of the phase-contrast microscope with Bertrand lens unit in a first operating state of the Bertrand lens unit according to one or more embodiments of the presently disclosed subject matter.
Figure 5:
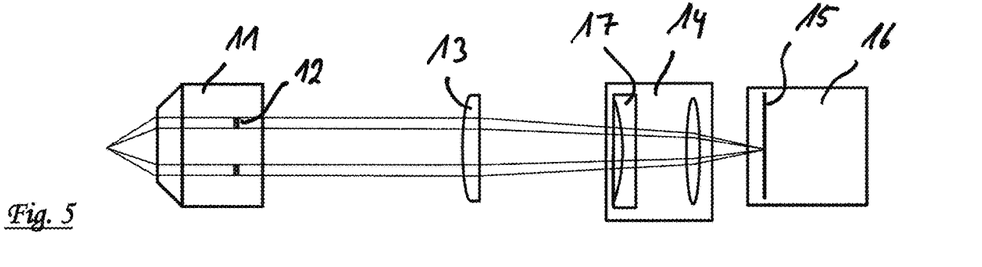
FIG. 5 is a schematic view of the section in accordance with FIG. 4 in a second operating state of the Bertrand lens unit according to one or more embodiments of the presently disclosed subject matter.

As advantageous configuration variants, FIG. 1 and partially FIGS. 4 and 5 show a phase-contrast microscope with a Bertrand lens unit 14, which can be located permanently in the beam path of the phase-contrast microscope. In order to be able to switch between imaging of the object plane, within which the specimen in the specimen vessel 5 is arranged, and imaging of the image-side microscope focal plane, in which the phase ring 12 is located, onto the image sensor 15, the Bertrand lens unit 14 is switchable and comprises a for example electronically deformable lens 17. It is thus possible to produce an optical system that is capable, depending on the requirements, both of delivering an image of the rear focal plane or of the phase ring 12 located there and of focusing the system onto the specimen. To switch to a Bertrand lens operation (first operating state), the focus-variable lens 17 is switched from a small to a large focal length, with the result that the coordinated beam between the objective 11 and the tube lens 13 is changed in a manner such that an image of the phase ring 12 is produced on the image sensor 15. This situation is illustrated in FIG. 4.

FIG. 5 shows the situation where the Bertrand lens unit 14 is "switched off." In this case, the specimen is imaged sharply on the image sensor 15.

The phase-contrast microscope according to the invention permits automated setting of the position or the swivel angles of the deflection element 8 and/or the position and possibly the shape of the phase diaphragm 2. The method can be for example as follows:

First, the curvature of the surface of the object liquid 6 is analytically approximated before the imaging process in dependence on the position of the specimen vessel within its XY plane from known parameters, such as for example the temperature T, the viscosity V, the diameter of the specimen vessel D and the filling level of the object liquid 6. The surface curvature can be described here for the sake of simplicity by way of the angles $\varphi'$ and $\theta'$ between the tangent to the surface curvature and the planar surface of the bottom of the specimen vessel 8. In order to ensure the deflection of the illumination beam 3 that is necessary to compensate the refraction of the illumination beam 3 at the object liquid 6, and with the assumption of at least similar optical densities of deflection element 8 and object liquid 6, the deflection angles $\varphi$ and $\theta$ of the deflection element (FIG. 1 merely illustrates $\varphi$) are set equal initially to the angular values $\varphi'$ and $\theta'$ of the tangent to the object liquid surface above the center of the specimen location to be observed. If the optical densities differ strongly, adapted angular values can also be used. In addition, the phase diaphragm 2 is displaced by an extent that fits with the expected parallel displacement of the main beam direction 28 in terms of its XY plane which is perpendicular with respect to the beam direction of the source light beam 1.

Subsequently, the Bertrand lens unit 14 is used to switch to the image sensor 15 for imaging the phase ring 12. This is done using a controller 19 for the Bertrand lens unit 14 that is illustrated schematically in FIG. 1. The image of the phase ring produced on the image sensor 15 of the camera 16 is evaluated automatically and checked with respect to the overlap of the image of the opening of the phase diaphragm 2 with the phase ring 12. By way of incremental adjustment of the parameters for roll and pitch angle $\varphi$ or $\theta$ of the deflection element 8 using a deflection element controller 20 and an XY displacement and, if necessary, a change in shape of the phase diaphragm 2 using a phase diaphragm controller 21, it is possible to observe and optimize the overlap of the images of the opening of the phase diaphragm 2 and of the phase ring 2 in situ. The overlap of the images can be assessed not only on the basis of the intermediate image of the phase ring 12, but alternatively or additionally directly on the basis of the re-established image contrast of the object image, to which one can switch back by way of switching the Bertrand lens unit 14.

As an alternative to the incremental changing of the swiveling of the deflection element 8 and the phase diaphragm 2, the surface curvature can be ascertained directly from the intermediate image plane by way of imaging not the phase diaphragm opening but a specific pattern, for example a grating structure, onto the rear objective focal plane. The pattern which is not illustrated in the figures can be produced advantageously using an electronically controllable adaptive element, for example using the same LCD that can also act as the phase diaphragm 2. On the basis of distortions of the assigned pattern which are determined in the image sensor 15, the shape of the pattern distortion produced by the curvature of the surface of the object liquid 6 can be ascertained by way of algorithms. The parameters for adapting the phase diaphragm 2 and the deflection element 8 can be calculated from this information.

Figure 6:
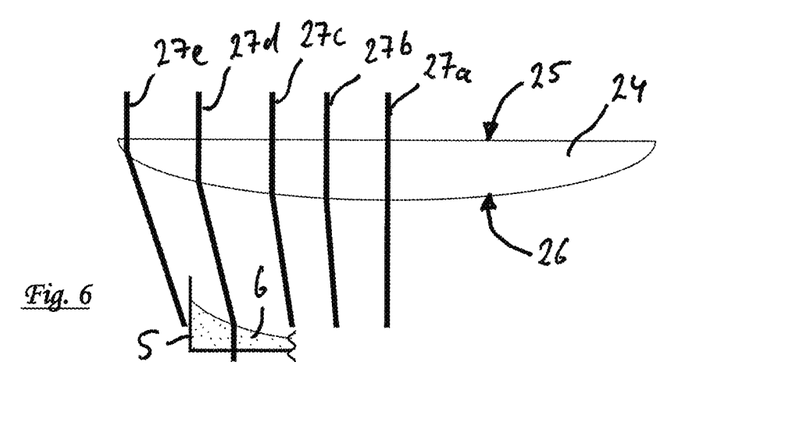
FIG. 6 is a schematic view of an alternative embodiment of a deflection element according to one or more embodiments of the presently disclosed subject matter.

FIG. 6 schematically illustrates an alternative deflection element 24 made of a solid material, e.g. glass, located above a specimen vessel 5 which is illustrated only as a detail. An upper entry surface 25 is formed to be planar, while an opposite exit surface 26 is convexly curved. A plurality of alternative main radiation directions 27a to 27e of the illumination beam 3 are illustrated in symbolized fashion. While the illumination beam 3 having the main radiation direction 27a passes through the deflection element 24 without refraction, the illumination beam 3 in the case of the main radiation directions 27b to 27e undergoes a stronger refraction.

In the situation illustrated in FIG. 6, the deflection of the main radiation direction 27d, effected by the deflection element 24, results in the desired compensation of the refraction produced by the object liquid 6. If a different location of the specimen in the specimen vessel 5 (not illustrated here) is intended to be investigated, which has a different curvature of the surface of the object liquid 6, it may be necessary for the deflection element 24 to be displaced relative to the specimen vessel 5 to adapt the deflection of the illumination beam 3 to the different curvature of the surface of the object liquid 6. The relative movement between the deflection element 24 and the specimen vessel 5 is effected by way of a translation of the deflection element 24 in the phase-contrast microscope.

LIST OF REFERENCE SIGNS

1 Source radiation beam
2 Phase diaphragm
3 Illumination beam
4 Condenser
5 Specimen vessel
6 Object liquid
7 Object holder
8 Deflection element
9 Deflection element liquid
10 Cover
11 Objective
12 Phase ring
13 Tube lens
14 Bertrand lens unit
15 Image sensor
16 Camera
17 Deformable lens
19 Bertrand lens unit controller
20 Deflection element controller
21 Phase diaphragm controller
22 Object holder controller
23 Exit surface
24 Deflection element
25 Entry surface
26 Exit surface
27 Illumination beam
28 Main radiation direction
29 Entry surface
30 Opening of the phase diaphragm Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

The invention claimed is:

1. A method for phase-contrast microscopy on a specimen, which is arranged in a specimen vessel having an object liquid, comprising:
applying a component of an illumination beam, which serves as direct radiation and has not been diffracted by the specimen, to a phase-shifting element;
deflecting the illumination beam before it enters the object liquid by way of an optical deflection element so as to compensate for a change in a main radiation direction of the illumination beam that occurs due to optical refraction at the object liquid,
wherein the optical deflection element is changeable in terms of shape and has an entry surface, an exit surface and a viscous mass arranged between the entry surface and the exit surface, and
wherein the entry surface is determined by a surface of said viscous mass that is formed by a gravity field; and
in order to deflect the illumination beam, swiveling the deflection element about at least one swivel axis.

2. The method of claim 1, further comprising:
checking an overlap of the direct radiation and the phase-shifting element, occurring at the location of the phase-shifting element; and
in order to optimize said overlap, changing a cross-section geometry and/or a position of the illumination beam, which position is in a plane perpendicular to the main radiation direction of the illumination beam before it is incident on the deflection element, by using at least one changeable optical adaptation element.

3. The method of claim 2, further comprising:
producing an optical pattern in a beam path in front of the specimen vessel;
capturing an distortion of the optical pattern that is produced in the region of the specimen vessel; and
using the extent of the optical pattern distortion to control the optical adaptation element.

4. The method of claim 1, further comprising:
producing an optical pattern in a beam path in front of the specimen vessel;
capturing a distortion of the optical pattern that is produced in the region of the specimen vessel; and using the extent of the optical pattern distortion to automatically control the shape of the optical deflection element.

5. A phase-contrast microscope suitable for observing a specimen arranged in a specimen vessel that includes an object liquid, comprising:
   means for producing an illumination beam;
   an object holder for holding the specimen vessel;
   at least one optical deflection element for changing the direction of the main radiation direction of the illumination beam, the at least one optical deflection element being arranged in a beam path of the illumination beam in front of the object holder and having an entry surface and an exit surface; and
   means for swiveling the deflection element about at least one swivel axis in order to controllably change an angle between the entry surface and the exit surface,
      wherein a viscous mass is arranged between the entry surface and the exit surface,
      wherein the entry surface is determined by a surface of the viscous mass that is formed in a gravity field.

6. The phase-contrast microscope of claim 5, wherein the entry surface is formed by a rigid and transparent cover element which floats or lies indirectly or directly on the surface of the viscous mass.

7. The phase-contrast microscope of claim 6, wherein the deflection element is swivelable about at least one axis perpendicular to the beam direction of the incident illumination beam.

8. The phase-contrast microscope of claim 5, wherein the deflection element is swivelable about at least one axis perpendicular to the beam direction of the incident illumination beam.

9. The phase-contrast microscope of claim 5, further comprising:
   means for observing the overlap of a component of the illumination beam that has not been diffracted by the specimen and serves as direct radiation with a phase-shifting element; and
   at least one changeable optical adaptation element for changing a cross-section geometry and/or position of the illumination beam, which position is in a plane perpendicular to the main radiation direction of the illumination beam.

10. The phase-contrast microscope of claim 9, wherein the means for observing the overlap includes a Bertrand lens unit having at least one lens, which is variably shapeable in terms of a focal position of the at least one lens, and means for controlling the at least one lens.

11. The phase-contrast microscope of claim 10, further comprising:
   means for producing an optical pattern being arranged in the beam path in front of the specimen vessel;
   means for determining the optical distortion of the optical pattern caused in the region of the specimen vessel; and
   means for controlling the optical adaptation element.

12. The phase-contrast microscope of claim 9, further comprising:
   means for producing an optical pattern being arranged in the beam path in front of the specimen vessel;
   means for determining the optical distortion of the optical pattern caused in the region of the specimen vessel; and
   means for controlling the optical adaptation element.

13. The phase-contrast microscope of claim 5, further comprising:
   means for producing an optical pattern being arranged in the beam path in front of the specimen vessel;
   means for determining the optical distortion of the optical pattern caused in the region of the specimen vessel; and
   means for controlling the shape of the optical deflection element.

* * * * *